US005707190A

United States Patent [19]
Hiraguri et al.

[11] Patent Number: 5,707,190
[45] Date of Patent: Jan. 13, 1998

[54] BLIND BOLT ASSEMBLY

[75] Inventors: Tokuo Hiraguri; Sohkichi Hiraguri, both of Nagano, Japan

[73] Assignee: ALPS Seiko Co., Ltd., Nagano, Japan

[21] Appl. No.: 745,642

[22] Filed: Nov. 8, 1996

[30] Foreign Application Priority Data

Nov. 10, 1995 [JP] Japan ............... 7-292806
Sep. 25, 1996 [JP] Japan ............... 8-253045

[51] Int. Cl.⁶ .................................................. F16B 13/06
[52] U.S. Cl. ....................... 411/56; 411/60; 411/29; 411/55
[58] Field of Search ........................ 411/55, 60, 56, 411/29, 48, 47, 45

[56] References Cited

U.S. PATENT DOCUMENTS

| 1,342,201 | 6/1920 | Beckwith | 411/29 |
| 3,460,429 | 8/1969 | Torre | 411/56 |
| 3,489,056 | 1/1970 | Blakeley | 411/56 |
| 4,287,807 | 9/1981 | Pacharis | 411/55 |
| 4,702,654 | 10/1987 | Frischmann | 411/55 |
| 5,383,753 | 1/1995 | Palm | 411/56 |

FOREIGN PATENT DOCUMENTS

| 4124332 | 1/1993 | Germany | 411/29 |
| 8-193609 | 7/1996 | Japan . | |

Primary Examiner—Flemming Saether
Attorney, Agent, or Firm—Lowe, Price, LeBlanc & Becker

[57] ABSTRACT

A blind bolt for fastening superposed construction materials with each other through insertion thereof into through holes formed in the construction materials, which blind bolt comprising a bolt section having a male screw, a flange portion formed at one end of the bolt body, and a tapered slanted surface extended from one end of the external peripheral surface of the flange portion to the male screw, a cylindrical spacer formed with a plurality of slits opened to one longitudinal end thereof, which spacer receiving the bolt body in such a manner that the slits are abutted against the flange portion, and a nut to be tightened by engaging with the male screw. With this construction above, as the bendable piece of the spacer is sandwiched between the inner surface of the holes in the construction materials and the flange of the bolt, even though the inner surface of the holes is mechanically deformed, the bendable piece is not severed, so that an extremely great tensile strength can be provided.

5 Claims, 10 Drawing Sheets

BLIND BOLT ASSEMBLY

BACKGROUND OF THE INVENTION

1. Field of the Invention

The present invention relates to a blind bolt for use in construction, which is capable of fastening superposed construction materials by inserting a blind bolt from one side thereof and tightening it with a nut also from the same side.

2. Description of the Prior Art

Figure 11:
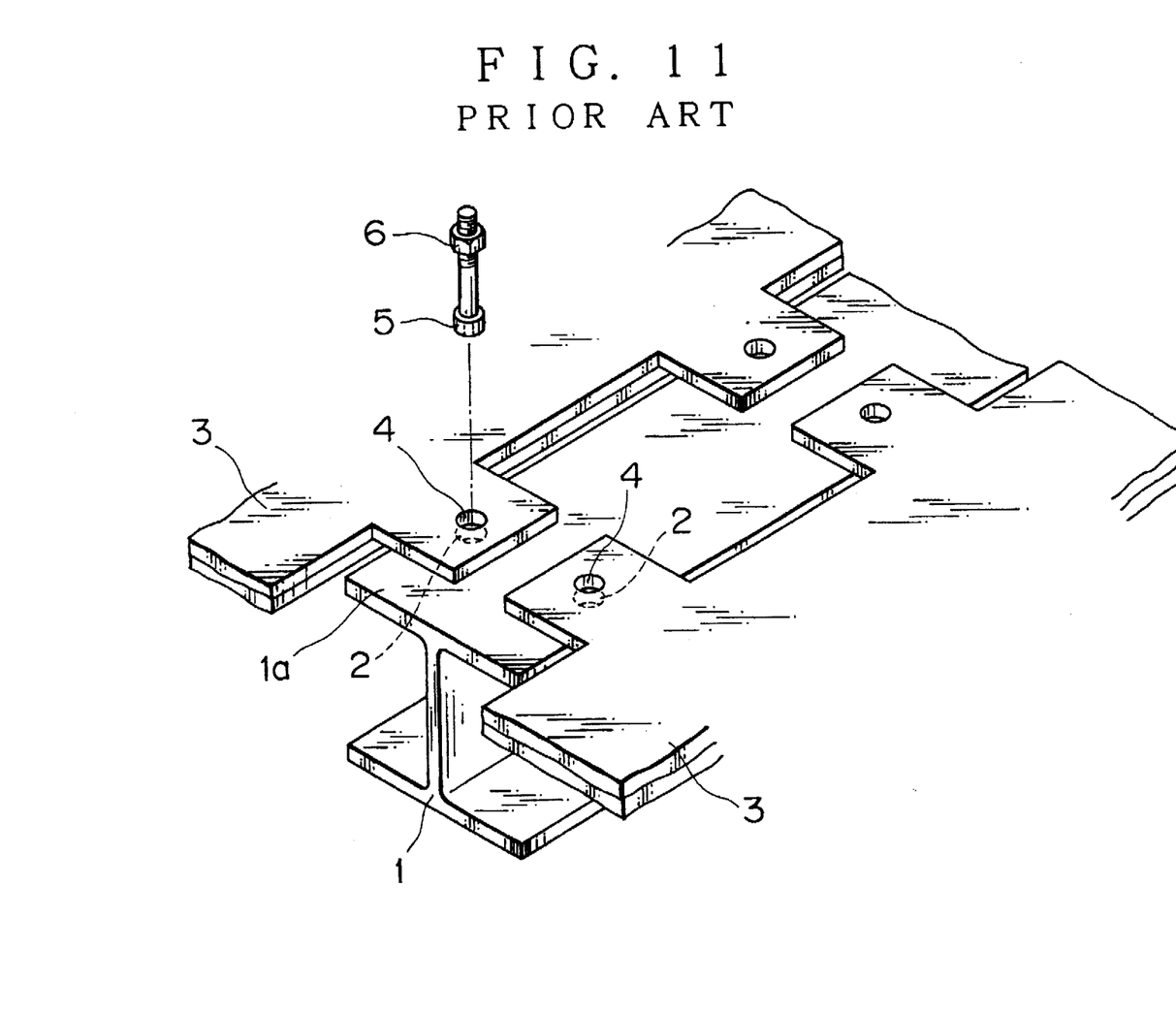
FIG. 11 is a perspective view showing an example of the holes formed in the construction materials.

The fastening operation of construction materials by way of a bolt is performed for example, as shown in FIG. 11, by first forming a hole 2 in a flange portion 1a of the upper surface of an H-steel (wide flange shapes) 1, then forming a hole 4 at a position aligned with the hole 2 in a floor plank 3 which is to be piled on the H-steel 1, and finally tightening a nut 6 to a gib-headed bolt 5 which has been inserted into the holes 2 and 4.

However, this operation requires for a worker to insert the gib-headed bolt 5 through the holes 2 and 4 from the lower side of the H-steel and also another worker to tighten the nut 6 from a side of the floor plank 3.

Since two workers are definitely needed for such a bolt tightening operation, not only it is costly but also the workability thereof is substantially unsatisfactory as the two workers have to co-operate with each other under a situation that they cannot see each other. Further, in the event that the space underneath the H-steel 1 is too small for the worker to enter, this operation cannot possibly be done.

From all these reasons above, there has been provided a blind bolt which enables both the bolt inserting operation and nut tightening operation from one side of the construction materials.

Figure 12:
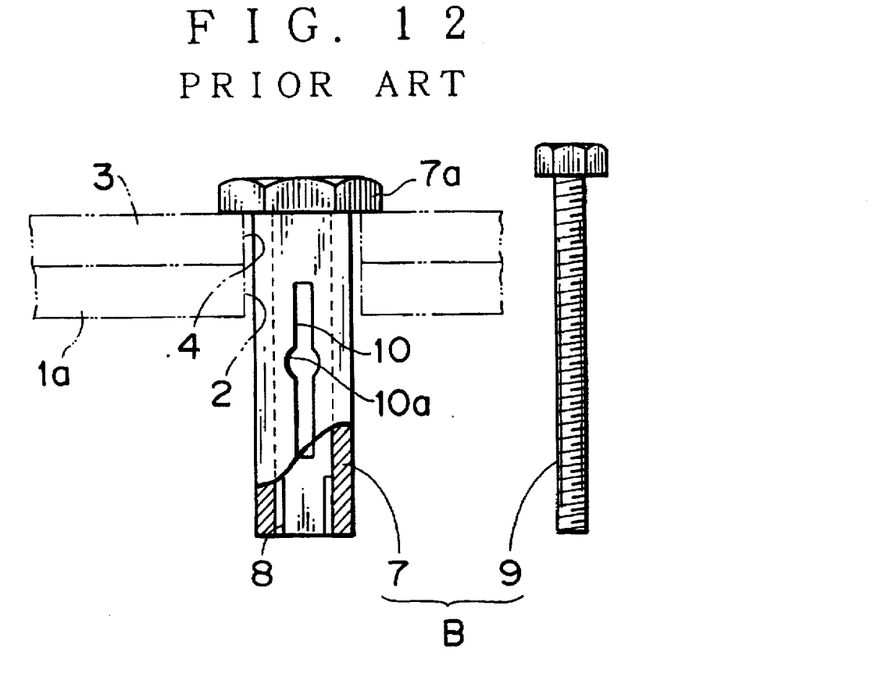
FIG. 12 is an exploded front view of a conventional blind bolt.
Figure 13:
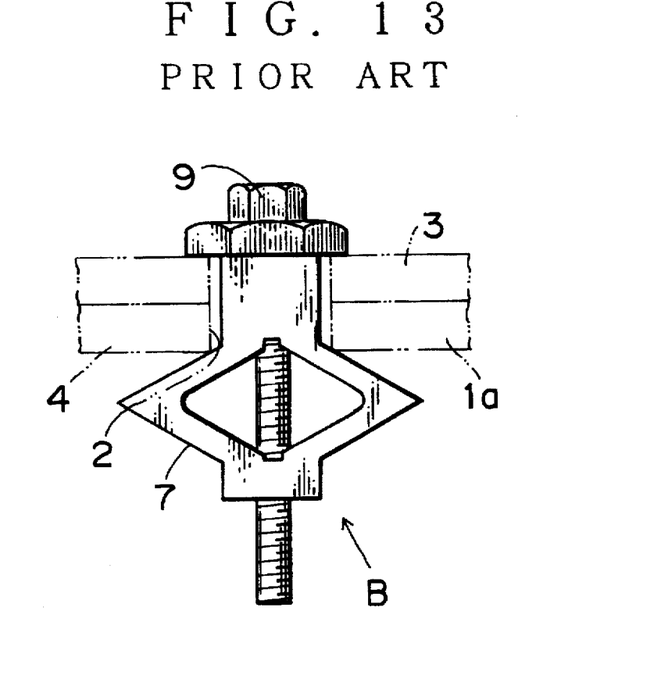
FIG. 13 is a front view for illustrating the fastened state of the construction materials with use of the conventional blind bolt.

FIG. 12 is a partly broken front view of a conventional blind bolt B, which is composed of a cylindrical sleeve 7 having a hexagonal head 7a at its uppermost end, while having a female screw 8 at the bottom end of its inner surface, and a bolt 9 which is to be inserted through the sleeve 7 and engaged with the female screw 8. At the middle portion of the sleeve 7, there are formed a plurality of slits 10, and at the center portion of each slit, there is formed a widened portion 10a for enabling the middle portion of the sleeve 7 to be readily bent.

In order to fasten the construction materials by inserting such blind bolts B into the holes 2 and 4, first insert the sleeve 7 into these holes from one side (from upper side in the case of FIG. 12) of the construction materials, and then screw the bolt 9 inserted in the sleeve 7 into the female screw 8, so that the sleeve 7 is bent at nearby the widened portion 10a by receiving a compressive load and formed into a hooked (<) shape, thus the sleeve 7 is expanded outwardly to be wider than the holes 2 and 4, and the construction materials 1a and 3 are fastened tightly by the blind bolt B.

However, since this conventional blind bolt B is excessively deformed only at the widened portion 10a of the sleeve 7, it becomes a weak point in view of the strength. Accordingly, when an external tensile force is applied to the blind bolt B, there is caused a breakage around this weak point and thus the expansion of the sleeve 7 just above this broken point is shrunk along the hole 2 and then taken off. This has been resulted in a shortage of the tensile resisting strength in respect of the applied tensile force.

For this reason, it has been requested for a long-time to provide a blind bolt whose tensile resisting strength with resect to a tensile force is excellent.

It is therefore an object of the present invention to eliminate the above problem and to provide a blind bolt whose tensile resisting strength is quite reliable.

SUMMARY OF THE INVENTION

In order to achieve the above objective, the present invention provides a blind bolt for use in construction for fastening the superposed construction materials by inserting it into through holes formed in the respective construction materials. The blind bolt of the present invention is composed of a bolt body having a male screw, a flange portion formed at one end of the bolt body, and a tapered surface extended from one end of the external peripheral surface of flange portion to the male screw, a cylindrical spacer formed with a plurality of slits opened at one end thereof, which spacer receives the bolt body in such a manner that the slits are abutted against the flange portion, and a nut to be engaged with the male screw. According to the present invention, the construction materials can be fastened tightly with the nut and the spacer deformed outwardly in the respective holes at its slitted portion.

In this construction above, it is preferable if the flange portion is formed with an annular recess at the external peripheral surface thereof for receiving a deformed portion of the spacer sandwiched between the inner surface of the respective through holes of the construction materials and the flange portion.

Further, it is preferable to form an outer diameter at the other end of the spacer to be substantially equal to an inner diameter of the through holes and then tapered toward the one end of the spacer by decreasing its diameter slightly.

Still further, it is also preferable to form an engaging portion at the other end of the bolt body so as to be clamped by a mechanical tool for preventing the bolt body from rotating jointly with the tightening of the nut.

Other features and advantages of the present invention will be apparent from the following description taken in connection with the accompanying drawing.

DETAILED DESCRIPTION OF THE PREFERRED EMBODIMENTS

In the following, a blind bolt B1 of the first embodiment of the present invention will be explained with reference to the drawings.

Figure 2:
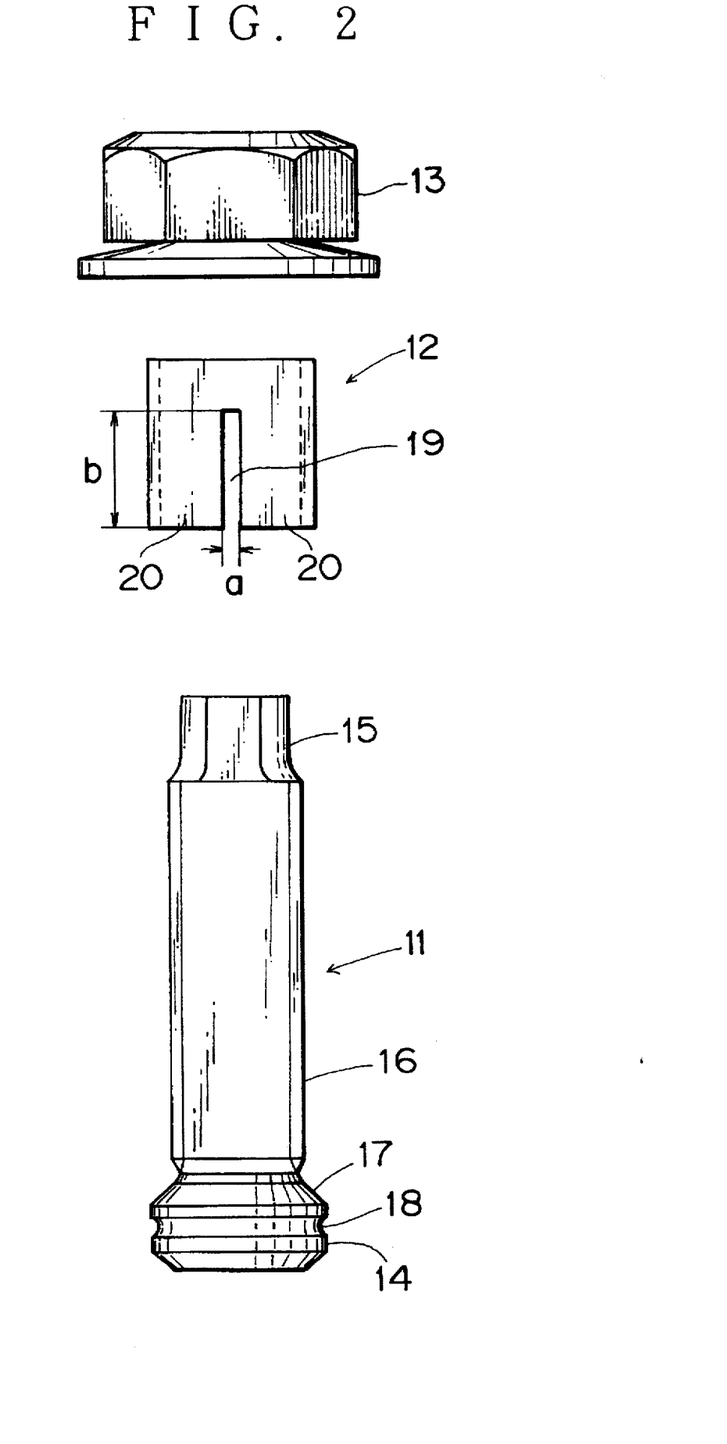
FIG. 2 is an exploded front view of the blind bolt of FIG. 1.

The blind bolt B1 is, as shown in FIG. 2, composed of a bolt body 11, a spacer 12 and a washer based nut 13, wherein the bolt body 11 is made of an alloy steel containing chrome-molybdenum, and is galvanized on the surface thereof for increasing its corrosion resistivity.

One end of the bolt body 11 is provided with a flange 14, while the other end thereof is provided with a engaging portion 15 having a square cross section and a male screw 16 is provided between the flange 14 and the engaging portion 15.

In this embodiment, although the cross section of the engaging portion 15 of the bolt is formed into the square shape, however, it may also be formed into a shape other than square shape.

The flange 14 has a diameter with which it can be inserted into respective holes 2 and 4 of the construction materials, and is provided with a tapered surface 17 which is a slant section for bridging an end of the peripheral surface of the flange with the male screw 16. The peripheral surface of the flange 14 is cylindrical and further provided with an annular groove 18 and this annular groove 18 is formed so as to have an arcuate surface which has substantially a large radius of curvature and is smoothly merged into the peripheral surface of the flange 14.

This annular groove 18 functions to greatly augment the tensile resisting strength of the blind bolt B1 as hereinafter described.

The engaging portion 15 is provided for preventing the bolt 11 from rotating when tightening the washer based nut 13.

The spacer 12 is formed into a cylindrical body made of a stainless steel for maintaining its corrosion resistivity and the strength which is strong enough to deform the through hole 2, and has an outer diameter with which it can be inserted into the holes 2 and 4 of the construction materials and that an inner diameter into which the bolt body 11 can be inserted. Further, the spacer 12 is provided with a plurality of slits 19 (four slits in this embodiment) opened to one end thereof (the lower end in case of FIG. 2) around the periphery thereof, whereby the portions between the neighboring slits 19 are so made as to form bendable pieces 20. The washer based nut 13 is provided with a female screw which engages with the bolt 11.

Next, the function of the blind bolt B1 realized in the first embodiment of the present invention will now be described by referring to FIGS. 3A to 3D and FIG. 4.

In the operation, the bolt 11 is first inserted into the spacer 12, and then the washer based nut 13 is engaged with the bolt 11. At this stage, the bendable pieces 20 of the spacer 12 are all brought into contact with the tapered surface 17 of the bolt 11 (refer to FIG. 3A and FIG. 1).

Figure 3A:
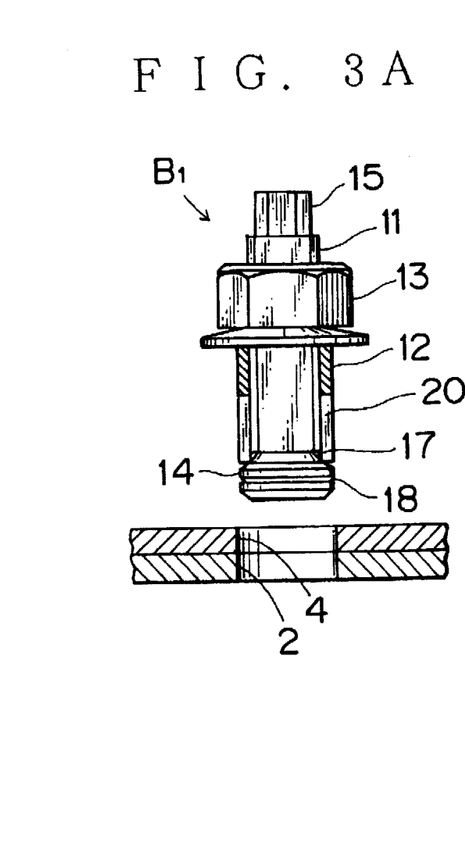
FIGS. 3A to 3D are longitudinal sectional views for illustrating the fastening operation of the construction materials by use of the blind bolt.
Figure 3B:
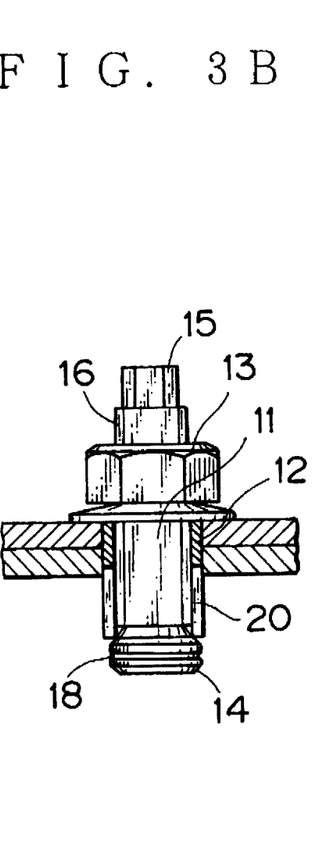
Figure 3C:
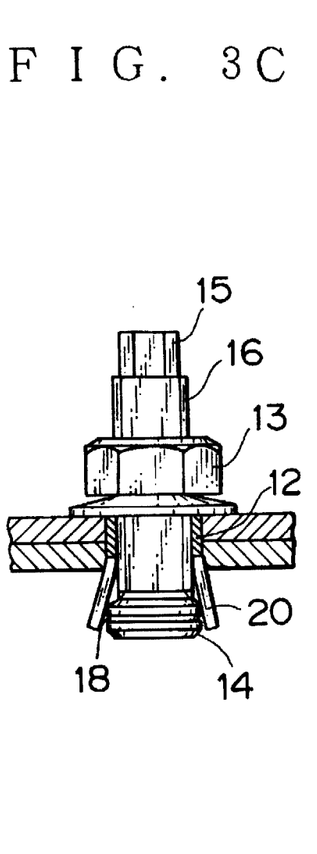
Figure 3D:
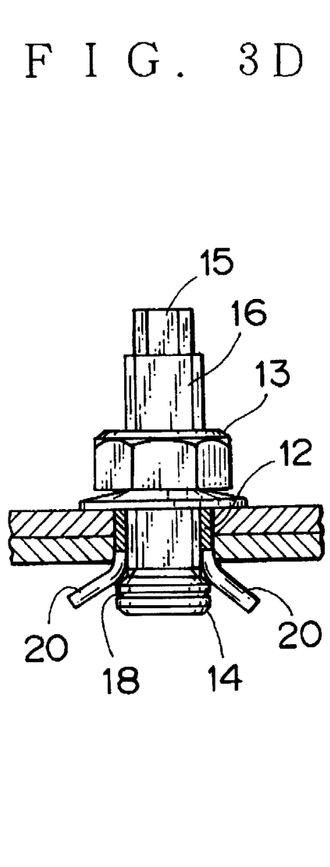
Figure 4:
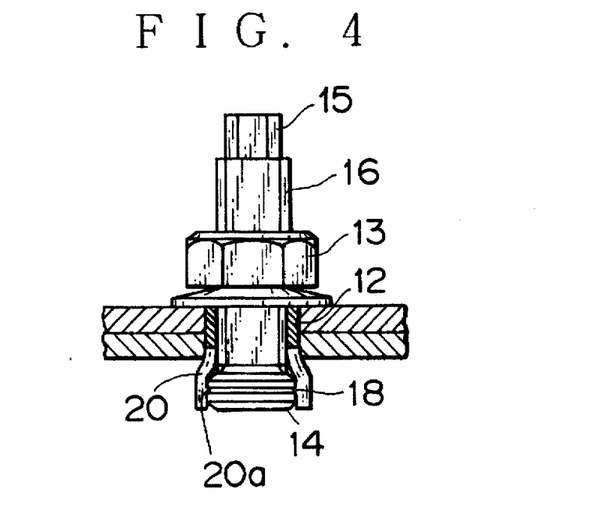
FIG. 4 is a longitudinal sectional view for illustrating the state in which a tensile load for a tensile test is applied to the blind bolt.

When, after inserting the blind bolt B1 into the through holes 4 and 2 (refer to FIG. 3B), the washer based nut 13 is tightened by clamping the engaging portion 15 simultaneously to prevent the rotation of the blind bolt, then the tip ends of the bendable pieces 20 are brought into contact with the tapered surface 17 and expanded as being slidably guided by the tapered surface (refer to FIG. 3C).

When further tightening the washer based nut 13, each of thus bent pieces 20 is sandwiched between the construction materials and the tapered surface 17 of the blind bolt (refer to FIG. 3D), and the construction materials are fastened to the blind bolt B1 firmly.

Figure 6A:
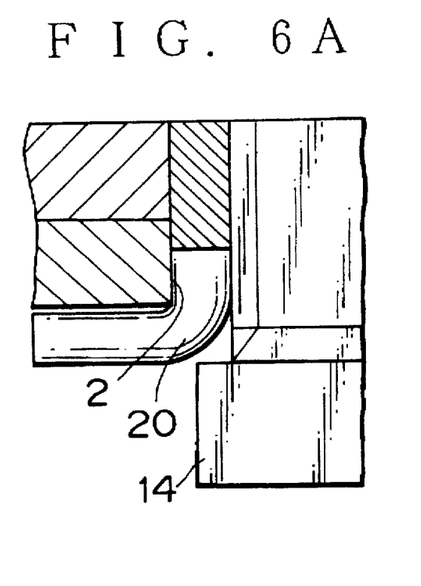
FIGS. 6A to 6D are explanatory views for illustrating the functional movement of a spacer of the blind bolt.
Figure 6B:
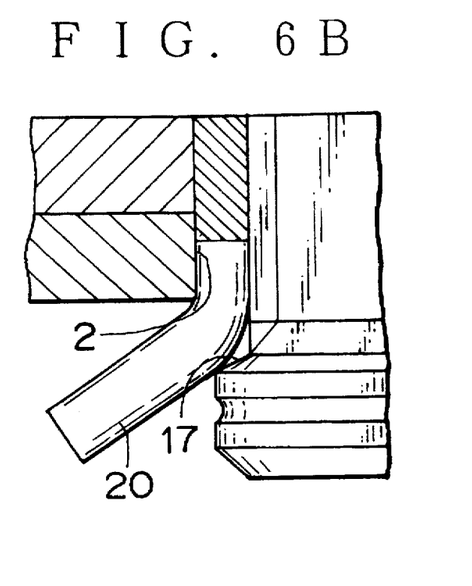

As shown in FIG. 6A, in case there were no tapered surface 17 on the flange 14, a large shearing force will be applied to each of the bendable pieces 20 by the construction materials as well as the flange 14, so that the bendable pieces 20 are likely to be shorn off from the spacer. However, as shown in FIG. 6B, if the bendable piece 20 is sandwiched between the construction materials and the tapered surface 17, the shearing force is made smaller and, at the same time, the compressive force and bending moment are applied onto the bendable pieces 20, so that the bendable pieces 20 are not shorn off but are bent along with the tapered surface 17.

In this course of tightening, if the blind bolt B1 is tightened by a force greater than that of being required, the contacting pressure between the holes 2 and 4 of the construction materials and the bendable pieces 20 is increased, and thereby causing a skid at the contacting surface.

Figure 6C:
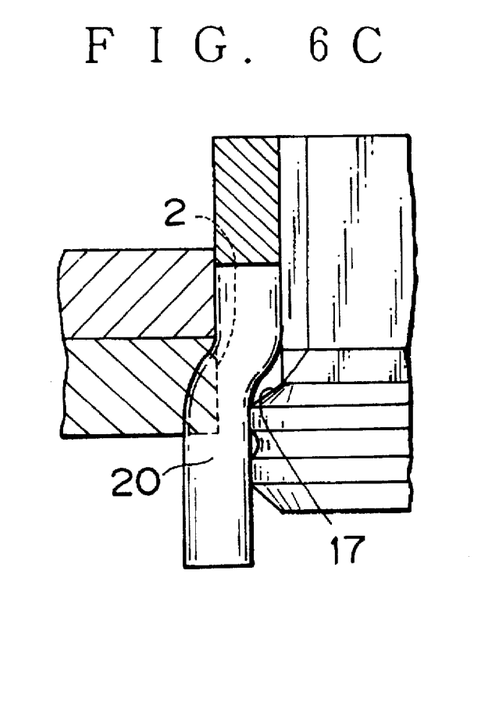

Since the construction materials are made of stainless steel, the through hole 2 (specially at the lower part thereof) is expanded from a position indicated by a chain line to a position indicated by a solid line through the plastic deformation thereof as shown in FIG. 6C and, simultaneously, the bendable pieces 20 of the stainless steel are thinned slightly by its plastic deformation (See FIG. 6C).

Figure 8:
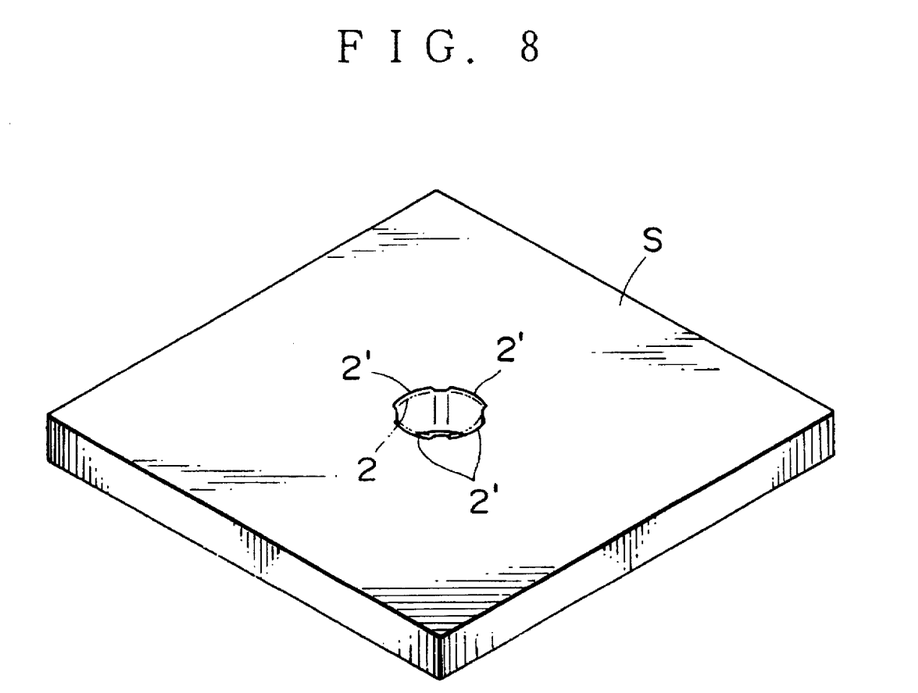
FIG. 8 is a perspective view for illustrating a change in the shape of the hole after the tensile test.

FIG. 8 is a perspective view observed from the back side of the plate member S used in the tensile strength test, wherein the back side of the plate S is deformed from an annular through hole 2 designated by a chain line to a through hole 2' indicated by a solid line. At the upper surface of the plate member S, the through hole 2' designated by the solid line is maintained almost the same shape as that of the original annular through hole 2. The through hole 2' has been expanded due to the plastic deformation caused by the compressive force of the four bendable pieces 20.

The lower surface of the plate member S is flat around the through hole 2' while the upper surface thereof is bulged at the periphery of the through hole. This bulge is considered to be caused due to the plastic deformation of the through hole 2.

Figure 6D:
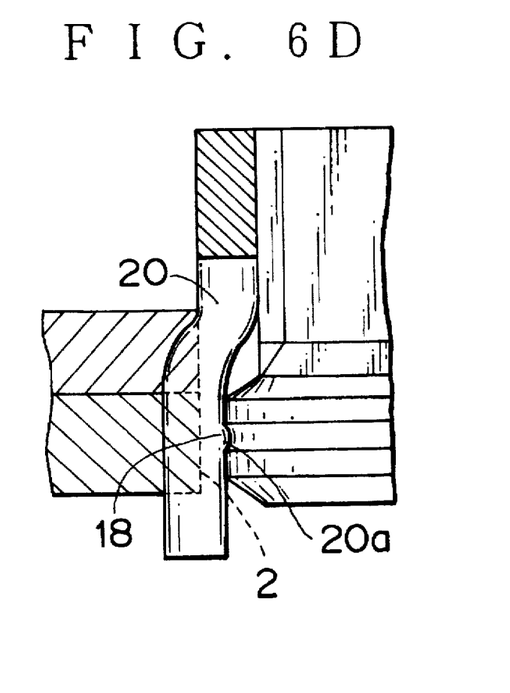

In case the flange 14 is formed with an annular recess 18, because of the plastic deformation of the bendable piece 20, there is formed an expanded portion 20a to be inserted into the annular recess 18 (refer to FIG. 6D). Since the spacer 12 is locked to the bolt 11 by the act of this expanded portion 20a, even though the bolt 11 is raised upwardly in accordance with the tightening operation of the washer based nut 13, the spacer 12 is also raised upwardly together with the movement of the bolt 11, and thus, the spacer will not come off even if the blind bolt B1 is tightened by an excessively large force.

Figure 1:
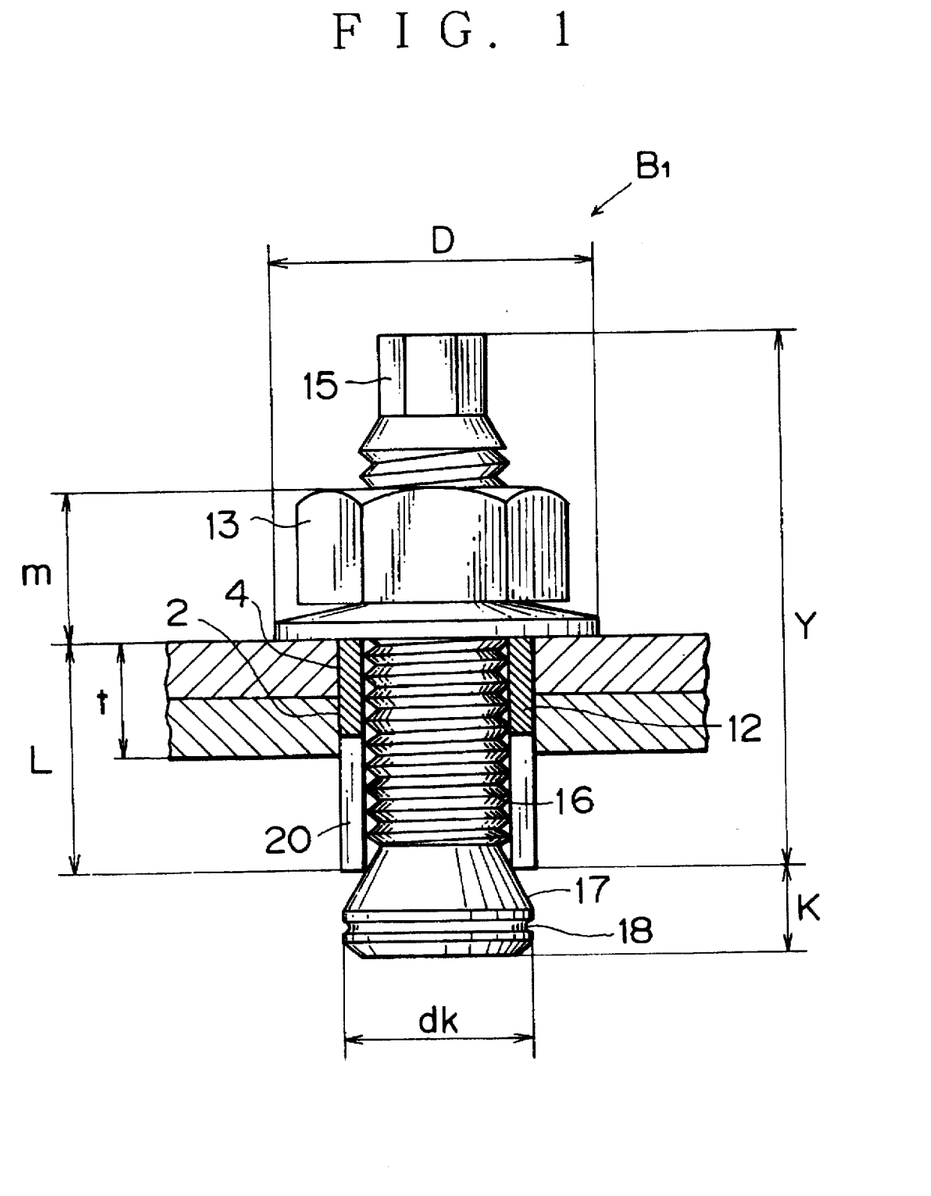
FIG. 1 is a longitudinal sectional view of a blind bolt inserted in construction materials piled one on the other.

The dimensions of the blind bolt used in the tensile strength test and the results are shown in Table 1, where the reference characters shown in the column for each dimension correspond to those shown in FIG. 1.

TABLE 1

| THICKNESS OF USED PLATE t | NOMINAL SCREW DIAMETER d | NOMINAL LENGTH Y | SHUNK DIAMETER dk | SHUNK HEIGHT K | LENGTH OF SPACER L | DIAMETER OF WASHER CONTAINING NUT D | HEIGHT OF WASHER CONTAINING DIAMETER m | MECHANICAL CHRACTERISTIC TENSIL LOAD | SHEAR LOAD |
|---|---|---|---|---|---|---|---|---|---|
| 4~15 | 8 | 35 | 10.5 | 5 | 20 | 18 | 8.5 | 2000 kgf | 1000 kgf |

As shown in the table, in spite of the fact that the blind bolt B1 is small in size, it is proved to be highly reliable that the blind bolt is endurable against an excessively large mechanical stress which is far beyond the actually required mechanical strength.

Figure 7:
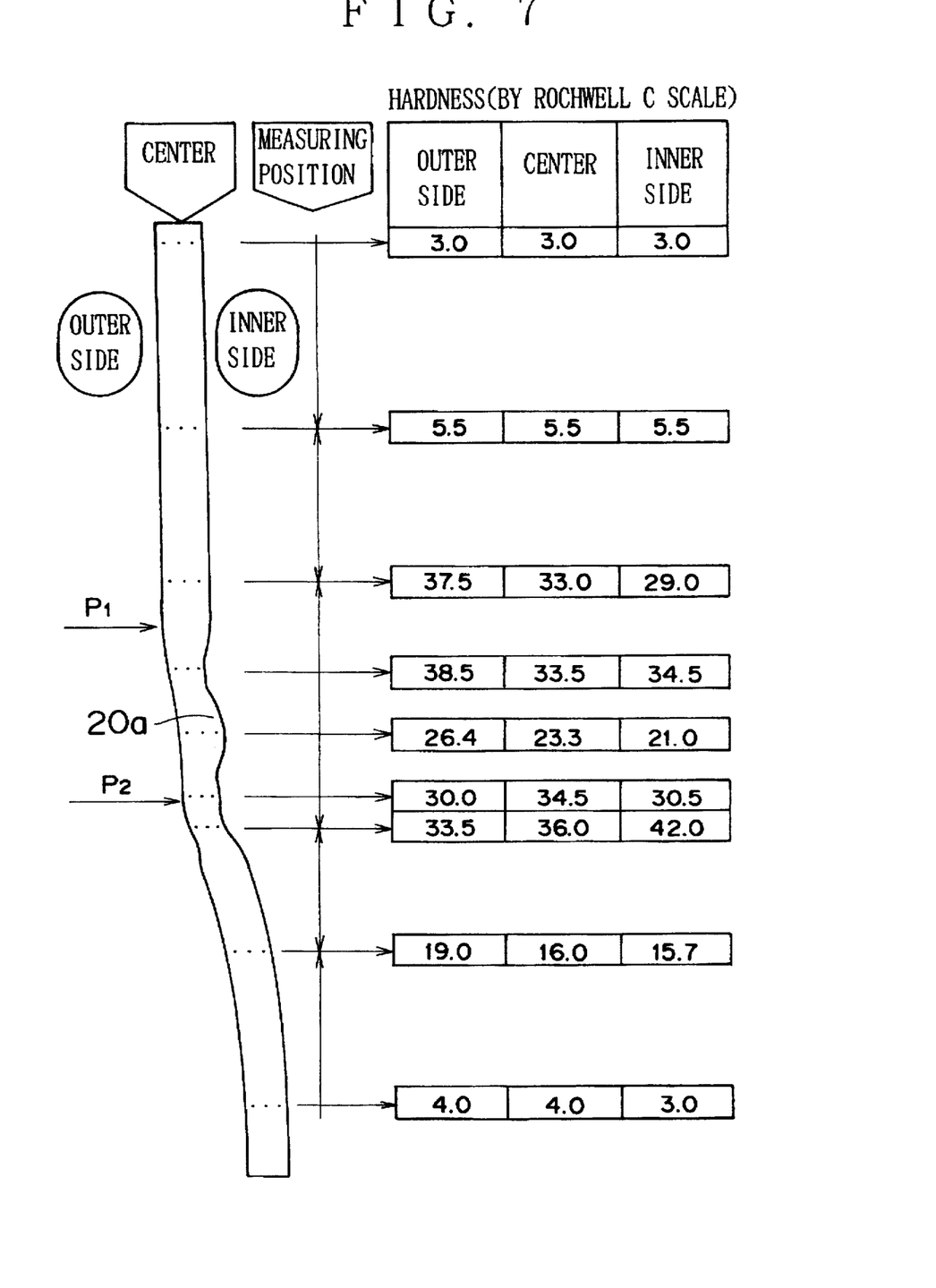
FIG. 7 is an illustration showing a change in the hardness and shape of the spacer after the tensile test.

FIG. 7 shows a sectional view and hardness at each part of the spacer 12 of the blind bolt B1 after the test has been implemented, wherein the hardness is measured in accordance with the Rockwell hardness number C. A direction of the spacer 12 in the drawing is such that the lower side thereof is a face to be abutted with the washer based nut 13, the right side thereof is an inner surface and the left side thereof is an outer surface.

Prior to the test, the spacer had an outer diameter of 10 mm, an inner diameter of 8 mm and a length of 20 mm, whereby a width a of the slit 19 was 0.5 mm and a length b of the slit 19 was 16 mm.

After the test, since the inner surface of the bendable piece 20 was pushed by the flange 14, the outer diameters at the points P1 and P2, both of which are in the close proximity of the expanded portion 20a, have become 12.18 mm and 11.98 mm respectively.

The thickness of the bendable piece 20 has become thinner at the both sides of the expanded portion 20a thereof.

Further, it has become clear that the hardness of the area sandwiched and pressed between the construction materials and the flange 14 has increased due to the work hardening phenomenon.

Figure 5:
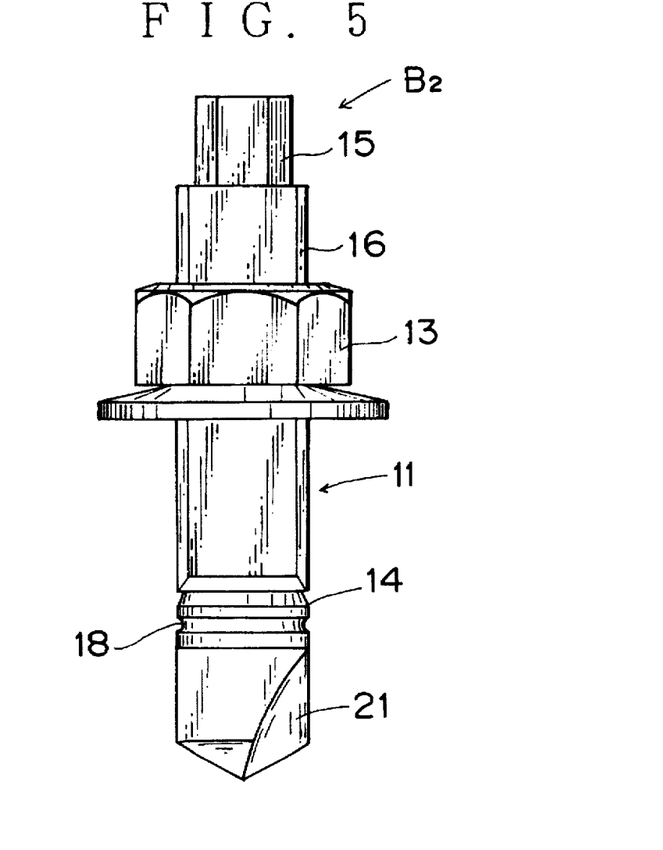
FIG. 5 is a front view of the blind bolt showing a second embodiment of the present invention.

FIG. 5 shows a front view of a blind bolt B2 illustrating the second embodiment of the present invention, wherein the flange 14 is provided with a drill 21 at its lower end, whereas the rest of the configurations are the same as that of the blind bolt B1. By use of this blind bolt B2, the fastening operation of the construction materials can be performed consecutively after making the through holes 2 and 4.

Figure 9:
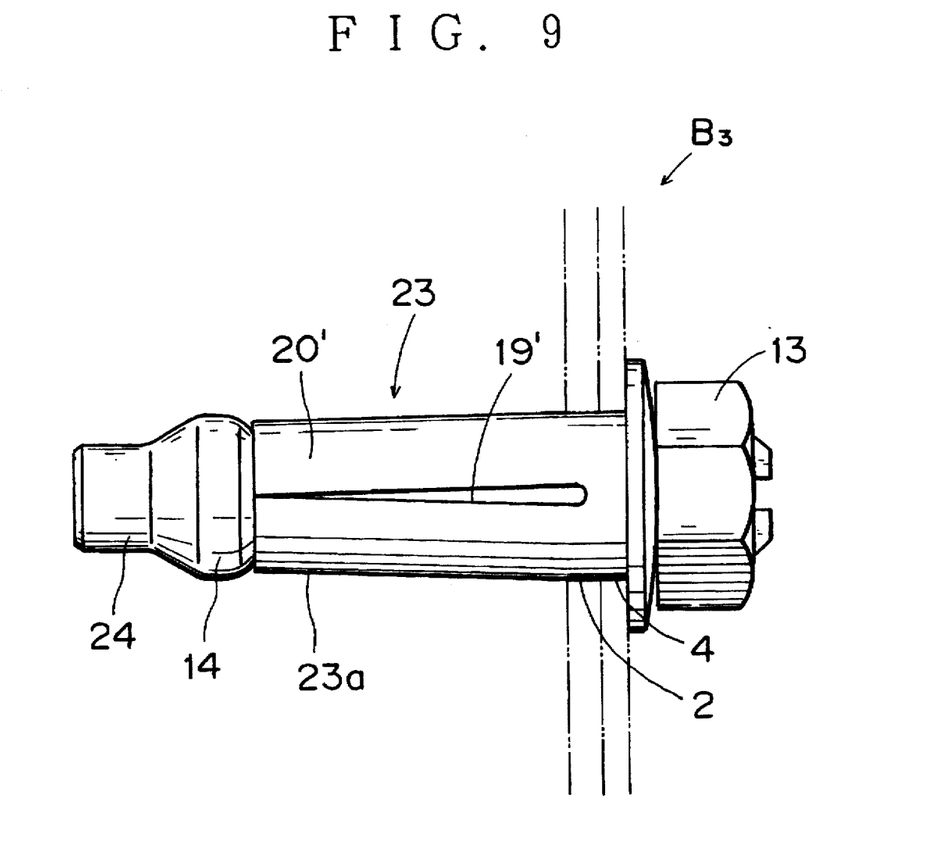
FIG. 9 is a front view of the blind bolt showing a third embodiment of the present invention.
Figure 10:
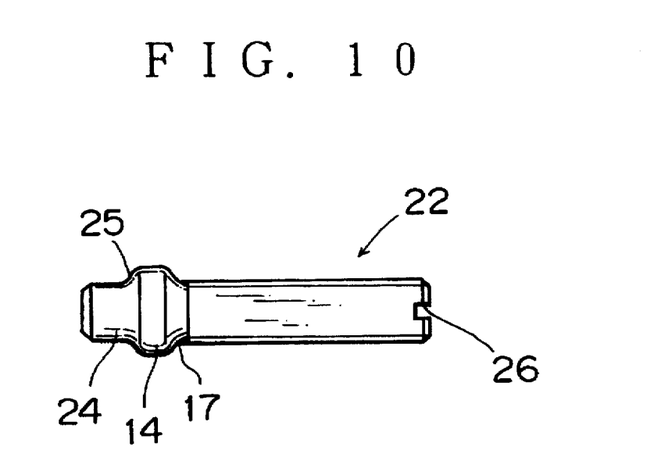
FIG. 10 is a front view of the blind bolt to be used in the third embodiment of the present invention.

FIG. 9 shows a front view of a blind bolt B3 illustrating the third embodiment of the present invention and FIG. 11 shows a front view of a bolt 22 which is a part of the blind bolt B3.

The blind bolt B3 of the third embodiment consists of the bolt 22, spacer 23 and nut 13, and the bolt 22 is provided with a flange 14 and tapered surface 17 as in the first embodiment.

Since the bolt 22 is provided with a guiding projection 24 at the tip end there of for guiding insertion which has a smaller diameter than that of the flange 14 and the guiding projection 24 is connected with the flange 14 by a tapered guiding surface 25, it is possible to insert the flange 14 into the respective through holes 2 and 4 even if there is a mismatching between the center axis thereof and that of the respective holes 2 and 4.

Further, the bolt 22 of the third embodiment differs from the bolt 11 in that an external peripheral surface of the flange 14 is provided with no annular groove 18 and an engaging portion 26, which has the same shape as a recess to receive the tip end of a screw driver, is provided in stead of a non-circular shift like engaging portion 15 of the bolt 11.

A reason why the annular groove 18 is not provided with the flange of the bolt 22 is that the strength of the blind bolt 22 against the tensile force is enough even if there is no annular groove 18.

Further, a reason why the engaging portion 15 is formed into the screw recess 26 is that this bolt 22 is not a type to be used with a specific impact wrench as in the first embodiment.

A spacer 23 of the third embodiment is also formed into a cylindrical shape similar to the spacer 12 of the first embodiment, wherein a plurality of slits 19' are provided toward one end of the spacer to form bendable pieces 20', while an outer diameter of the other end of the spacer 12 (the right end in FIG. 9) is so formed as to be substantially the same as an inner diameter of through holes 2, 4. An external diameter of the one end of the spacer is made slightly smaller than that of the other end to form a tapered surface 23a as shown in FIG. 9.

This tapered surface 23a functions to guide the spacer 23 for making it easier to insert the spacer 23 into the through holes 2 and 4 even if the center axes thereof are deviated with each other, and to automatically align the deviated center axes of the through holes 2 and 4 by the insertion of the spacer 23.

Since the through holes 2 and 4 are formed by punching, variations in inner diameter are very small, and since the outer diameter at the other end of the spacer 12 is made substantially equal to the inner diameter of the through holes 2 and 4. Further, through the tightening operation of a nut 13 engaged with the bolt 22, the misalignment of the through holes is eliminated as the other end of the spacer being pressed against the inner wall of the through hole 4 and also inner walls of the bendable pieces 20' are pushed by the flange 14 to bend outwardly to abut the spacer 12 against the inner wall of the through holes 2 and 4 to provide a self alignment therebetween.

In the blind bolt B3 of the third embodiment of the present invention, in the same manner as in the first and second embodiments, the tapered surface 17 pushes the inner wall of the bendable pieces 20' in accordance with the tightening of the nut 13 to cause the plastic deformation of the through hole 2, and thus the bendable pieces 20' functions as a wedge for preventing the blind volt B3 from pulling out. Accordingly, this spacer eliminates the bothersome work of tapering the inner wall of the through hole 2 beforehand.

[Effect of the Invention]

Since the blind bolt according to the present invention is configured as explained heretofore, the following effects can be expected.

(1) With use of the blind bolt in accordance with the present invention, workability of clamping the construction materials which has been encountered with problems can be greatly improved by making it easier since the clamping operation of the construction materials can be carried out from one side of the construction materials.

(2) Since the bendable pieces of the spacer have the strength to enlarge the through holes by tightening the nut, the bendable pieces act as a wedge for the construction materials by abutting against the enlarged portion of the through holes, and this in turn eliminates the bothersome tapering of the through hole of the construction materials beforehand, thus the working of construction can be greatly simplified.

(3) By forming the outer diameter of the other end of the spacer 12 to be substantially the same as an inner diameter of through holes and an external diameter of the one end of the spacer is made slightly smaller than that of the other end to form a tapered surface therebetween, it is possible to insert the blind bolt therethrough even if there exits misalignment between the two through holes since the tapered surface functions to guide the spacer for making it easier, to make the needed corrections in alignment and to automatically align the axes of the through holes by the insertion of the blind bolt.

(4) By use of a special impact wrench, which tightens the washer based nut while avoiding the joint rotation of the bolt, not only the tightening operation is facilitated, but the operability is also greatly improved.

(5) As it can be readily miniaturized and the configuration thereof is so simple, it can be manufactured quite economically.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A blind bolt assembly for fastening two or more sheets of superimposed construction material with each other by insertion into through holes formed in said respective sheets, comprising:

a bolt body having a male screw thread at a first end section and a flange portion at a second end of said bolt body, said flange portion having a cylindrical portion and a tapered portion, the tapered portion having a tapered surface which tapers inwardly from a peripheral edge of the cylindrical portion, toward the male screw thread formed on the first end section of said bolt body;

a cylindrical spacer having a plurality of slits extending from a first end thereof, said spacer being disposed about said bolt body so that the first end of said spacer abuts against the tapered surface of the flange portion;

a nut threadably engageable with the male thread for drawing the flange portion into said spacer and toward the sheets of construction material so as to distort said spacer and secure the sheets of construction material together; and annular recess formed in a periphery of the cylindrical portion for receiving a deformed portion of said spacer caused by the pressure between the inner wall of said through holes and said flange portion upon tightening said nut.

2. The blind bolt assembly as claimed in claim 1, wherein said flange portion is further provided with a drill having the same diameter as the flange portion, at a bottom thereof.

3. The blind bolt assembly as claimed in claim 1, wherein the first end of said bolt body is provided with an engaging part adapted to be engaged by mechanical means for preventing simultaneous rotation of said nut and said bolt body.

4. The blind bolt assembly as claimed in claim 3, wherein said engaging part is formed into a non-circular shape.

5. The blind bolt assembly as claimed in claim 3, wherein said engaging part is formed into a recess to receive a screw driver.

* * * * *